United States Patent [19]
Feldman et al.

[11] 3,854,037

[45] *Dec. 10, 1974

[54] SEXTANT HAVING NIGHT VIEWING CAPABILITY AND DIGITAL READOUT AND PORTABLE COMPUTER SYSTEM

[75] Inventors: Sidney Feldman, Silver Spring; Harry C. Ketts, III, Aquasco, both of Md.

[73] Assignee: The United States of America as represented by the Secretary of the Navy, Washington, D.C.

[ * ] Notice: The portion of the term of this patent subsequent to Aug. 14, 1990, has been disclaimed.

[22] Filed: Dec. 4, 1972

[21] Appl. No.: 312,066

[52] U.S. Cl. .......................... 235/150.27, 356/247
[51] Int. Cl. ...................... G01c 1/08, G02b 23/12
[58] Field of Search .......... 235/156, 151.3; 33/267, 33/268, 1 T, 1 PT; 356/147

[56]         References Cited
         UNITED STATES PATENTS

| | | | |
|---|---|---|---|
| 2,704,400 | 3/1955 | Baldocchi | 33/267 |
| 2,941,082 | 6/1960 | Carbonara et al. | 33/268 |
| 3,027,797 | 4/1962 | Collen et al. | 33/268 X |
| 3,571,567 | 3/1971 | Eckermann | 33/268 X |
| 3,627,997 | 12/1971 | Samuels et al. | 235/151.3 |
| 3,654,449 | 4/1972 | Boyce | 235/156 |

Primary Examiner—Eugene G. Botz
Attorney, Agent, or Firm—R. S. Sciascia; J. A. Cooke

[57]         ABSTRACT

A portable celestial navigation system utilizing a hand-held sextant having night viewing capability and electrical digital readout of the altitude of celestial bodies, as by a shaft rotation encoder, coupled to a miniature, dedicated, special purpose portable computer. The computer, comprising an accurate clock and ephemeral data, such as the Nautical Almanac data, is programmed to combine all the data to solve the celestial navigation problem and compute a line-of-position or ships position.

1 Claim, 3 Drawing Figures

SEXTANT HAVING NIGHT VIEWING CAPABILITY AND DIGITAL READOUT AND PORTABLE COMPUTER SYSTEM

BACKGROUND OF THE INVENTION

This invention relates generally to navigation instruments and more particularly to a sextant and computer combination whereby a hand held sextant is used to obtain the angle of elevation of a heavenly body, which angle is telemetered to a computer which combines time and Nautical Almanac data to solve the celestial navigation problem and give an output of ship's line-of-position, commonly known as sight reduction.

The traditional sextant is still in use today by modern navigators and the design has remained substantially unchanged for 250 years. It consists of a hand-held, quadrant-shaped frame having an arm fixed for rotation at the center of the quadrant circle and clampable around the circumference of the quadrant, which is marked with degrees, minutes and seconds of arc. The arm has vernier indicia cooperating with the arc markings on the quadrant. A tiltable mirror is attached to and moved by the arm for reflecting the image of a celestial body into a sight line parallel to the sight line of the horizon. The sextant is used by holding the frame in the right hand, the arm with the left hand, and sighting at the horizon, while at the same time rotating the arm and mirror in respect to the frame to bring the reflected image of the chosen celestial body into coincidence with the horizon. When in coincidence, the navigator calls "mark" to a helper who notes the exact time of the observation. The navigator then lowers the sextant to read under minimum night light conditions the angle of elevation of the body, and gives the reading to the helper who records it opposite the "marked" time. In many cases a helper is not available and this becomes a crude, awkward, and inaccurate operation. The recommended procedure is taking a minimum of three celestial bodies, and it is desirable to take at least five sightings of each body. This procedure is extremely tedious and subject to errors in transmitting and transcribing the data. Further, because the sightings are taken with difficulty from a vehicle moving in pitch, yaw and roll, seldom are five sightings taken, resulting in inaccurate "fixes."

Sight reduction procedures in marine navigation have been traditional for nearly 150 years, just as the sextant has followed the traditional design. The art of sight reduction involves a rote method of solving the navigation problem. The reduction of each sextant sighting to true azimuth and altitude intercept requires the navigator to apply the sextant data (altitude and time) to standard forms, and add height and refraction data, assumed latitude and longitude, and data taken from the Nautical Almanac and the many volumes of the sight reduction tables. Simple arithmetic (addition and subtraction) is carried out on the data to obtain chart plotting data.

As should be readily apparent, the rote method of sight reduction involves much time, is tedious, and subject to many errors. Time is consumed consulting the Nautical Almanac and sight reduction tables where data must be extracted and interpolation made before transcribing onto the standard forms. The major deficiency in the method are the common and frequent blunders made by the navigator in extracting wrong information such as from the wrong volume, page or line as well as the making of arithmetic errors in solving the navigation problem.

Celestial navigation, using the triditional simple sextant and the rote sight reduction methods, still persists in use largely because, if done carefully, it provides reliable fixes and allows checking and updating of more sophisticated inertial and radio navigation. Furthermore the system can be used, albeit crudely, on small boats, life rafts, in space and on other planets, and when stranded, such as on a remote island. Mariners have always put faith in the stars and other heavenly bodies.

Recent attempts in the past to alleviate the deficiencies of the traditional celestial navigation methods have suggested the use of adding machines or calculators to eliminate arithmetic errors, precomputation methods and tables to eliminate errors in extracting data, and complex inertial navigation systems to avoid celestial navigation altogether. Each has its own deficiencies and does not solve the problems of the traditional method.

The instant invention alleviates the problems in celestial navigation but retains the use of a hand-held sextant, such as the sextant disclosed in the copending Patent application Ser. No. 168,931, filed Aug. 4, 1972 of Sidney Feldman and now U.S. Pat. No. 3,752,591. To this hand-held, day-night capability, digital read-out sextant, is added a miniature, specialized, dedicated computer, preprogrammed to directly solve the spherical trigonometrical equations of the celestial navigation problem, and containing the Nautical Almanac data and accurate time information. The tedium of extracting and interpolating data from tables and arithmetic calculation is eliminated, permitting one navigator to obtain the suggested five sights on each of three stars and thus obtain accurate navigation fixes in the open seas at night, as well as during the day.

SUMMARY OF THE INVENTION

Accordingly, an object of the present invention is to provide an sextant-computer system that provides accurate celestial navigation fixes.

Another object of the instant invention is to provide a celestial navigation system that eliminates the tedious rote arithmetic sight reduction calculations.

A further object of the instant invention is to provide a celestial navigation system that directly solves the spherical trigonometry equations thus eliminating the manual use of sight reduction tables and Nautical Almanac.

A still further object of the subject invention is to provide a celestial navigation system using a hand-held sextant which sends altitude data to a preprogrammed computer containing accurate time and Nautical Almanac data.

Still another object of the instant invention is to provide a celestial navigation system capable of obtaining day and night sights and computing a position therefrom.

A still further object of the instant invention is to provide a celestial navigation system where one man alone is capable of attaining accurate fixes.

Briefly, these and other objects of the instant invention are attained by the use of a hand-held sextant having day-night horizon viewing capability and electric signal output representing the altitude of a celestial body coupled to a computer, programmed to solve the celestial navigation spherical triangle equation with time and Nautical Almanac data input.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings, wherein.

DESCRIPTION OF THE PREFERRED EMBODIMENT

Figure 1:
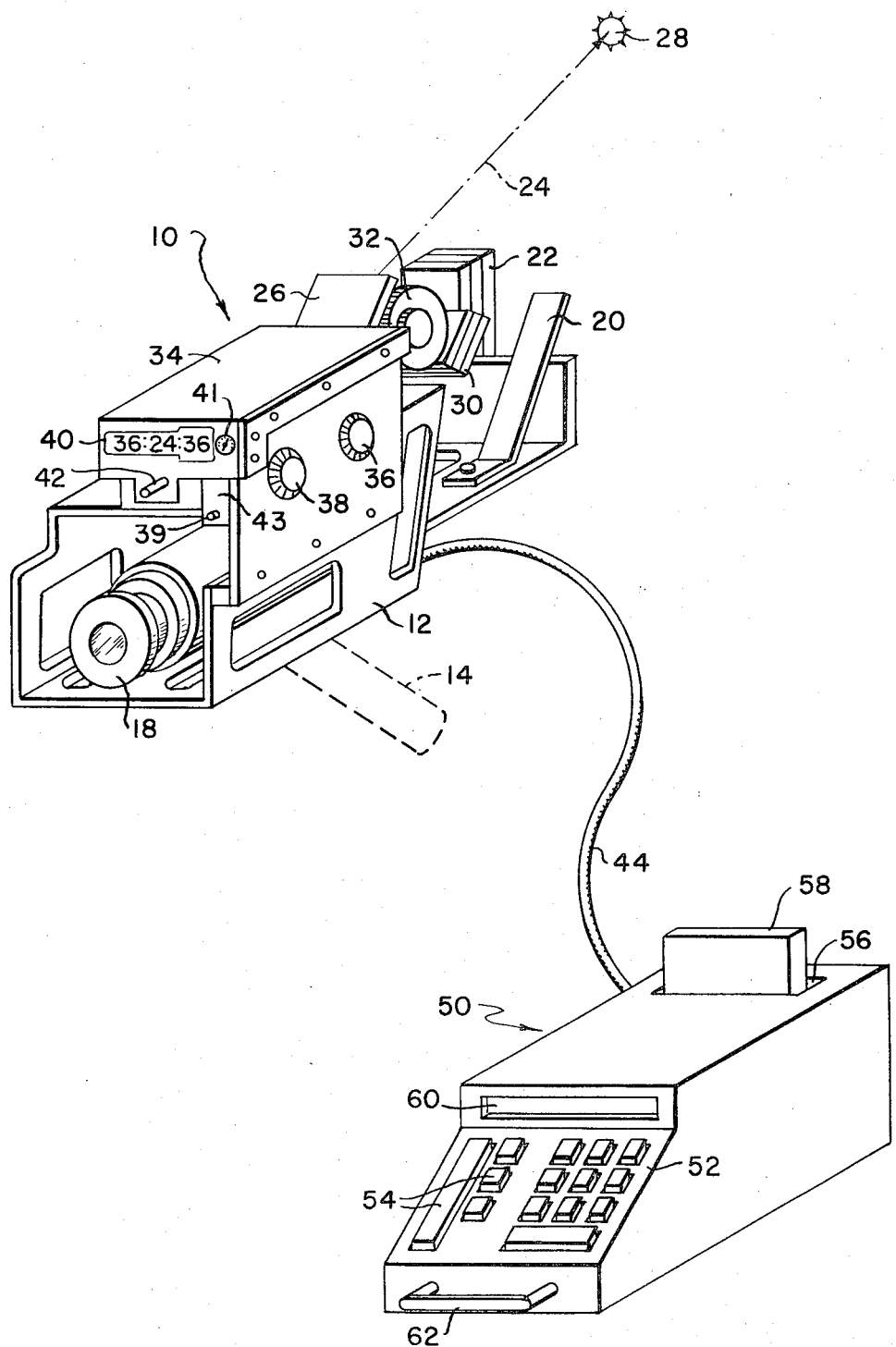
FIG. 1 is a pictorial view of the sextant coupled to a computer.

Referring now to the drawings, wherein like reference numerals designate corresponding parts in the several views, there is shown in FIG. 1, generally, a sextant 10 having a body 12 in the form of an elongate box, open at both ends. A handgrip 14 is centrally located laterally on the bottom of the box and movable along the line of sight to be clamped at the center of gravity when the instrument is in use. As shown in FIG. 1, mounted within the box frame body 12 is a night viewing scope 18 of the electronic light image enhancing type for viewing the horizon at night. The Army uses a first-generation, three-stage image intensification night vision telescope, serial number AN/PVS 3, which may be used as the viewing scope 18. A commercial verison of the army telescope is manufactured by Varo, Inc. of Dallas, Tex. and distributed under the trade name "Noctron." It is to be understood that the night viewing scope 18 may be replaced with iron sights, sighting tube or a telescope as required for daylight viewing.

At the forward end of the box frame 12 is a horizon mirror 20, silvered on either the left or right half to permit a direct line of sight of the horizon through the clear portion and a reflective view of a celestial body through the mirror portion. Forward of the horizon mirror is a set of horizon shades 22 of various densities and colors. On a line-of-sight 24 and mounted for rotation in a transverse horizontal plane is an index mirror 26 for directing the line-of-sight 24 to a celestial body 28. A set of index mirror filter shades 30 are mounted forward of the index mirror 26.

The index mirror 26 is mounted on an index plate 32 rotatably attached to a control and gear box 34 which contains a reduction gear train (not shown) ultimately coupled to a course adjustment knob 36, a fine adjustment knob 38, and a digital readout counter 40. An electrical shaft encoder 43, having a push-button 39 thereon producing a signal output representing degrees, tenths and hundredths of degrees, is mechanically coupled to the gear train at the counter 40 and electrically connected to a cable 44. For convenience during night use, a pilot light 42 illuminates the counter 40. A chronograph 41 or the like is mounted adjacent to the counter 40.

Still referring to FIG. 1 there is shown generally, a small, portable, special purpose computer 50 which is electrically connected to the cable 44 from the sextant 10. Computer 50 has a keyboard 52 with a plurality of data keys 54 for manually entering data. Behind the keyboard 52 is an access slot 56 having memory reading capability such as tape head, card reader or the like (not shown) for accepting Nautical Almanac data from a memory 58, such as a cassette, cards, tape, solid state memory or the like. Above the keyboard 52, is a digital readout display screen 60 using "nixie tubes," light emitting diodes, or a removable, printed record, such as paper tape, to indicate the solution to the celestial navigation problem. A conventional hand grip 62 is secured on the front edge below the keyboard 52 so the computer may readily be carried to the observation sight or chart room.

The operation of the real time celestial navigation system is discussed with reference to FIG. 2 wherein a block diagram of the computer 50 shows the inputs to, the computation of, and the outputs of the computer. Sextant 10 provides the observed altitude ($h_s$) of a star 28 from the shaft encoder 43 via the cable 44 when the button 39 is depressed. When the computer receives the altitude signal, a clock 55 in the computer 50 makes an output of the day and exact time of the observation. The navigator then manually inserts the star identification number by depressing the keys 54 of keyboard 52. The computer then searches a memory 58 for the ephemeral data associated with the identified star.

The other information required by the computer include an assumed position data, represented by a Dead Reckoning (DR) or assumed latitude position (L) and DR or assumed longitude position ($\lambda$); which is manually keyed in on keyboard 52. Similarly, the value of "Dip Correction" (DIP) is keyed in manually.

Figure 2:
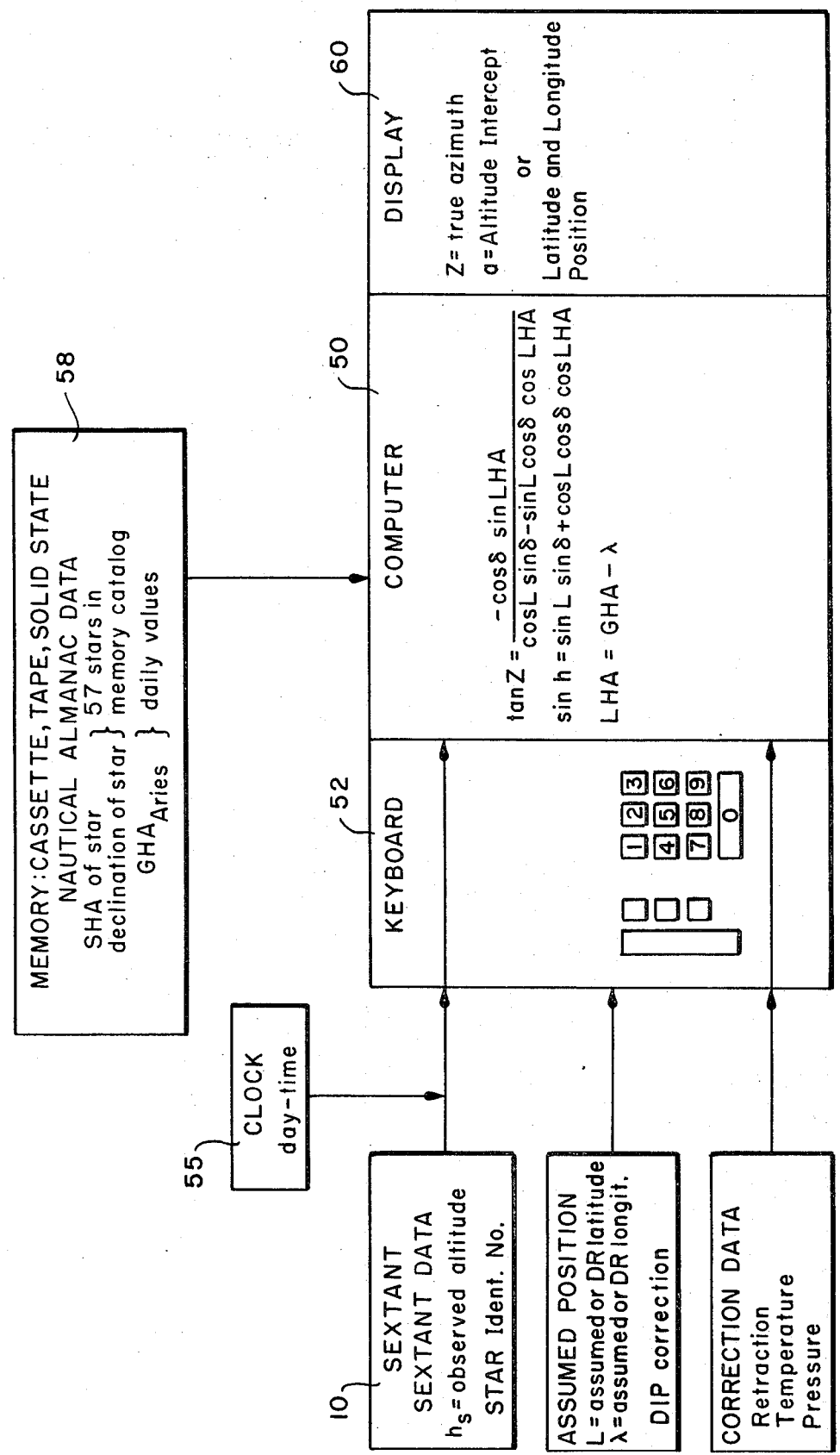
FIG. 2 is a block diagram showing the data inputs, computations and output of the computer.

Additionally, other less variable correction data shown in the Correction Data block of FIG. 2, such as refraction, temperature and pressure (if abnormal atmospheric conditions exist) are keyed in manually on the keyboard 52. Nominal values for refraction, temperature and pressure are included in the star data and therefore these corrections are not usually required. Accordingly, their input is shown by the double arrow as going directly into the computer 50.

The ephemeral data for each star comprises, in the memory 58 for each of the 57 stars in the catalog, the star's Sidereal Hour Angle ($SHA_{star}$), the daily values of Greenwich Hour Angle of Aries ($GHA_{Aries}$), and the declination of the stars.

Figure 3:
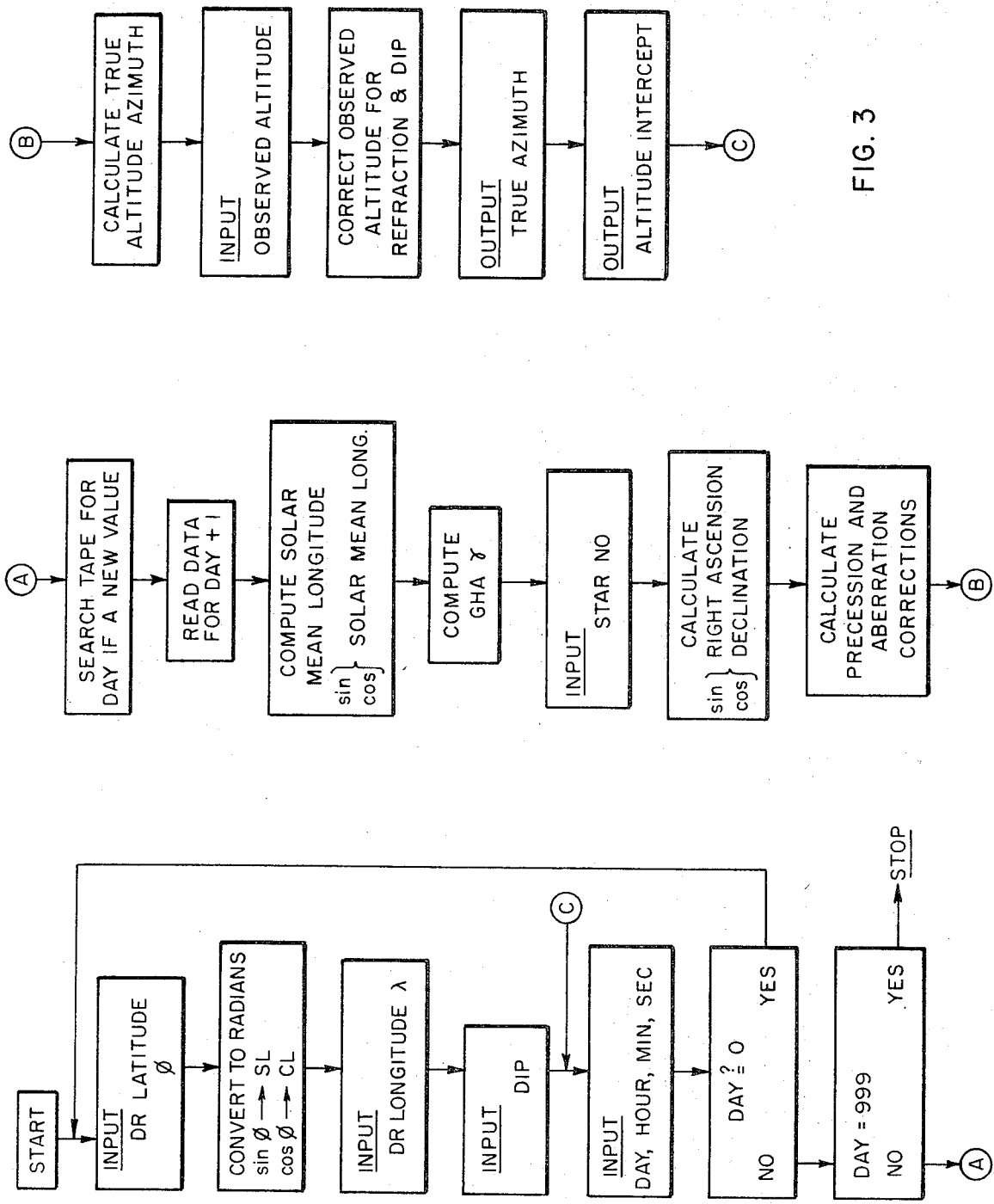
FIG. 3 is a flow chart of one possible program used with the computer.

The computer 50 now has all the required data from the sextant 10, the keyboard 52, the clock 55, and the memory 58 to solve the celestial navigation trigonometric equations for the tangent of azimuth (Z): $\tan Z = -\cos\delta \sin LHA / \cos L \sin\delta - \sin L \cos\delta \cos LHA$ and for the sine of altitude (h): $\sin h = \sin L \sin\delta + \cos L \cos\delta \cos LHA$, and the relationship: $LHA = GHA - \lambda$, where $GHA = GHA_{aries} + SHA_{star}$, from whence true azimuth (Z) and altitude intercept (a) are derived by, as is known in the art, correcting for aberration and precision. These values for azimuth (Z) and altitude intercept (a) for that particular star are read-out on the display 60 which may be copied or left on paper tape for later plotting on a chart. FIG. 3 is a functional flow chart of one program which may be used by computer 50 to generate the necessary parameters and to solve the celestial navigation equations.

Since the manually changed correction data and memory data are still in the computer, the navigator can quickly take the recommended five sights on the selected star, insert the sextant data, and read the display to select the best sights he takes. After he is satisfied with the values for the first star, he takes sights on the next selected stars, preferably five, and repeats the computer procedure discussed above. Each solution provides an azimuth ($Z$) and altitude intercept ($a$) values which may be plotted on a chart from the assumed or DR position to provide a line-of-position as is well known in the art. The intersection of the lines-of-position form the ship's position which can be read off the chart in latitude and longitude if desired.

As can be readily understood, and is shown in FIG. 2 by the double arrowed lines from the sextant 10 block through the keyboard 52 of the computer 50, a standard sextant may be used and the data keyed in on keyboard 52. Furthermore if desired, and when the state-of-the-art of microcomputers permits, latitude and longitude position may be directly read out on the display 60 for later chart plotting.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A portable, real-time celestial navigation system adapted to be used for either day or night navigation, comprising:
   a hand-held sextant adaptable for day and night use comprising
   an electronic light enhancing telescope removably mounted on said sextant for viewing the night horizon,
   a horizon mirror affixed to said sextant in optical alignment with said telescope,
   a tiltable index mirror rotatably mounted on the line-of-sight of said sextant,
   a gear train connected to said index mirror for changing the angle of tilt,
   manual coarse and fine adjustment means coupled to said gear train for affecting the tilt of said index mirror,
   a shaft encoder mechanically coupled to said gear train for producing an electrical output representing the altitude of a celestial body, said electrical output being controlled by means of a push-button on said sextant,
   a handgrip movably attached at the center of gravity of said sextant; and
   a portable computer for solving the trignometric equations of celestial navigation, said computer being coupled to said sextant and adapted to accept said electrical output, said computer containing
   means for reading ephemeral data of celestial bodies into said computer, said reading means comprising a first reader having a magnetic head for reading data stored on magnetic tape and a second reader for reading data from punched cards,
   a manual input means comprising a keyboard having manually depressable key operatively connected to said computer,
   a clock providing an automatic output of time and data to said computer, said clock input being controlled by said push-button control on said sextant,
   memory means for input data, and
   readout means comprising an erasable digital display and a removable printed record for displaying the solution of the celestral navigation equations.

* * * * *